US012689076B2

(12) United States Patent
Li et al.

(10) Patent No.: US 12,689,076 B2
(45) Date of Patent: Jul. 21, 2026

(54) BATTERY HEATING APPARATUS AND CONTROL METHOD THEREOF, CONTROL CIRCUIT AND POWER PLANT

(71) Applicant: CONTEMPORARY AMPEREX TECHNOLOGY (HONG KONG) LIMITED, Hong Kong (CN)

(72) Inventors: Zhanliang Li, Ningde (CN); Yu Yan, Ningde (CN); Zhimin Dan, Ningde (CN); Yuanmiao Zhao, Ningde (CN); Xinwei Chen, Ningde (CN); Jinfeng Gao, Ningde (CN); Xiaojian Huang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 26 days.

(21) Appl. No.: 18/434,388

(22) Filed: Feb. 6, 2024

(65) Prior Publication Data

US 2024/0178473 A1 May 30, 2024

Related U.S. Application Data

(63) Continuation of application No. PCT/CN2022/080261, filed on Mar. 11, 2022.

(51) Int. Cl.
H01M 10/637 (2014.01)
B60L 53/30 (2019.01)
(Continued)

(52) U.S. Cl.
CPC ........... H01M 10/637 (2015.04); B60L 53/30 (2019.02); B60L 53/53 (2019.02); B60L 58/27 (2019.02);
(Continued)

(58) Field of Classification Search
CPC ............. H01M 10/637; H01M 10/615; H01M 10/425; B60L 58/27; B60L 53/53; B60L 53/30; H02J 7/02
(Continued)

(56) References Cited

U.S. PATENT DOCUMENTS 9,153,976 B2    10/2015  Kim
2012/0025755 A1    2/2012  Xu et al.
(Continued)

FOREIGN PATENT DOCUMENTS

CN    103972605 A    8/2014
CN    111181208 A  *  5/2020    .............. B60L 58/27
(Continued)

OTHER PUBLICATIONS

The European Patent Office (EPO) The Extended European Search Report for Application No. 22930316.9 Oct. 7, 2024 8 Pages.
(Continued)

*Primary Examiner* — Rexford N Barnie
*Assistant Examiner* — Swarna N Chowdhuri
(74) *Attorney, Agent, or Firm* — ANOVA LAW GROUP, PLLC

(57) ABSTRACT

A battery heating apparatus includes a voltage transformation module and a control module. The voltage transformation module includes a first voltage transformation circuit configured to connect a charging apparatus, a first switch module connected to the first voltage transformation circuit, a second voltage transformation circuit configured to connect a power battery, and an energy storage element and a second switch module connected to the second voltage transformation circuit. The control module is configured to, in a first heating mode, control the first switch module to turn off the first voltage transformation circuit, and control the second switch module so that the second voltage transfor-
(Continued)

500

Control, in a first heating mode, the first switch module to turn off the first voltage transformation circuit, and control the second switch module so that the second voltage transformation circuit and the energy storage element form a loop for discharging from the power battery to the energy storage element and a loop for charging the power battery by the energy storage element — 510

Control, in a second heating mode, the first switch module and the second switch module so that the first voltage transformation circuit and the second voltage transformation circuit form a loop for discharging from the power battery to the charging apparatus and a loop for charging the power battery by the charging apparatus — 520 mation circuit and the energy storage element form a loop for discharging from the power battery to the energy storage element and a loop for charging the power battery by the energy storage element, for heating the power battery during discharging and charging.

20 Claims, 5 Drawing Sheets

(51) Int. Cl.

| | |
|---|---|
| *B60L 53/53* | (2019.01) |
| *B60L 58/27* | (2019.01) |
| *H01M 10/42* | (2006.01) |
| *H01M 10/615* | (2014.01) |
| *H02J 7/00* | (2006.01) |
| *H02J 7/02* | (2016.01) |

(52) U.S. Cl.
CPC ....... *H01M 10/425* (2013.01); *H01M 10/615* (2015.04); *H02J 7/02* (2013.01); *H02J 7/865* (2026.01); *B60L 2210/10* (2013.01); *B60L 2210/30* (2013.01); *H01M 2010/4271* (2013.01); *H01M 2220/20* (2013.01); *H02J 2207/20* (2020.01)

(58) Field of Classification Search
USPC .......................................................... 307/9.1
See application file for complete search history.

(56) References Cited

U.S. PATENT DOCUMENTS

| | | | | |
|---|---|---|---|---|
| 2014/0197778 | A1 | 7/2014 | Kim | |
| 2014/0210417 | A1 | 7/2014 | Kim | |
| 2014/0285155 | A1* | 9/2014 | Choi | H02J 7/02 |
| | | | | 320/134 |

FOREIGN PATENT DOCUMENTS

| | | | | | |
|---|---|---|---|---|---|
| CN | 111347853 | A | | 6/2020 | |
| CN | 111347893 | A | | 6/2020 | |
| CN | 111525196 | A | | 8/2020 | |
| CN | 112977171 | A | * | 6/2021 | ............. B60L 15/20 |
| CN | 113733986 | A | * | 12/2021 | ......... H01M 10/441 |
| CN | 114851918 | B | | 1/2024 | |

OTHER PUBLICATIONS

The World Intellectual Property Organization (WIPO) International Search Report and Written Opinion for PCT/CN2022/080261 Nov. 29, 2022 14 pages (including English translation).
The China National Intellectual Property Administration (CNIPA) First Review Notice for Application No. 202280004224.2 Jun. 20, 2023 24 Pages (With Translation).

* cited by examiner

500

Control, in a first heating mode, the first switch module to turn off the first voltage transformation circuit, and control the second switch module so that the second voltage transformation circuit and the energy storage element form a loop for discharging from the power battery to the energy storage element and a loop for charging the power battery by the energy storage element 510

Control, in a second heating mode, the first switch module and the second switch module so that the first voltage transformation circuit and the second voltage transformation circuit form a loop for discharging from the power battery to the charging apparatus and a loop for charging the power battery by the charging apparatus 520

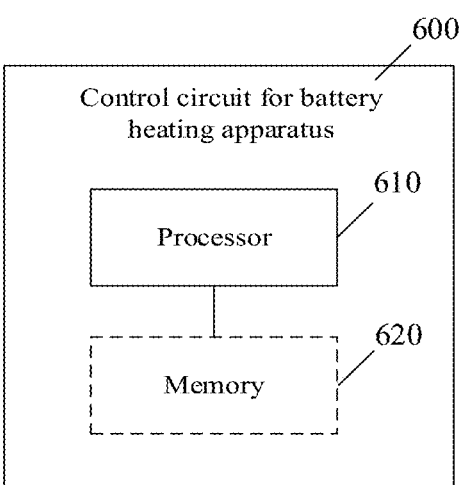

Control circuit for battery heating apparatus

Processor 610

Memory 620

Fig. 6

BATTERY HEATING APPARATUS AND CONTROL METHOD THEREOF, CONTROL CIRCUIT AND POWER PLANT

CROSS-REFERENCE TO RELATED APPLICATION

This application is a continuation of International Application No. PCT/CN2022/080261, filed on Mar. 11, 2022, the entire content of which is incorporated herein by reference.

TECHNICAL FIELD

The present application relates to the field of battery technologies, and in particular, to a battery heating apparatus and control method thereof, control circuit and power plant.

BACKGROUND ART

Due to the advantages of high energy density, recyclable charging, safety and environmental protection, power batteries are widely used in the fields of new-energy vehicles, consumer electronics, energy storage systems, and the like.

However, the use of power batteries in low temperature environments may be limited, for example, a discharge capacity of a power battery in a low temperature environment will seriously decline, and the battery cannot be charged in the low temperature environment. Therefore, in order to be capable of using the power battery normally, it is needed to heat the power battery in the low temperature environment. How to effectively heat the power batteries has become an urgent problem to be solved.

SUMMARY

The present application provides a battery heating apparatus and control method thereof, control circuit and power plant, which is capable of effectively heating a power battery.

In a first aspect, a battery heating apparatus is provided for heating a power battery. The battery heating apparatus includes a voltage transformation module and a control module. The voltage transformation module includes: a first voltage transformation circuit, and a first switch module connected to the first voltage transformation circuit, the first voltage transformation circuit being configured to connect a charging apparatus; and a second voltage transformation circuit, as well as an energy storage element and a second switch module connected to the second voltage transformation circuit, the second voltage transformation circuit being configured to connect the power battery. The control module is configured to control, in a first heating mode, the first switch module to turn off the first voltage transformation circuit, and control the second switch module so that the second voltage transformation circuit and the energy storage element form a loop for discharging from the power battery to the energy storage element and a loop for charging the power battery by the energy storage element, for heating the power battery during discharging and charging.

In the embodiment of the present application, the battery heating apparatus includes a voltage transformation module, and the voltage transformation module is composed of the first voltage transformation circuit connected to the charging apparatus and the second voltage transformation circuit connected to the power battery. The first switch module is added to the first voltage transformation circuit, and the second switch module and the energy storage element are added to the second voltage transformation circuit to make up for an insufficient inductance of a coil in the second voltage transformation circuit. In this way, by controlling the first switch module to turn off the first voltage transformation circuit, and controlling the second switch module so that the second voltage transformation circuit and the energy storage element form the loop for discharging from the power battery to the energy storage element and the loop for charging the power battery by the energy storage element, so that heating of the power battery may be realized during discharging and charging.

In an implementation, the control module is further configured to control, in a second heating mode, the first switch module and the second switch module so that the first voltage transformation circuit and the second voltage transformation circuit form a loop for discharging from the power battery to the charging apparatus and a loop for charging the power battery by the charging apparatus, for heating the power battery during discharging and charging.

In this embodiment, in addition to heating the power battery by using the first heating mode, the power battery may also be heated by using the second heating mode. In the second heating mode, by controlling the first switch module and the second switch module, the first voltage transformation circuit and the second voltage transformation circuit form the loop for discharging from the power battery to the charging apparatus and the loop for charging the power battery by the charging apparatus, so as to realize the heating of the power battery during discharging and charging. In the first heating mode, only the second voltage transformation circuit and the energy storage element are used to realize charging and discharging of the power battery, thus shortening charging and discharging paths, reducing a certain amount of switch control operations, and avoiding unnecessary communication time delay during the control. Compared with the second heating mode, the switching frequency of a switch may be increased in the first heating mode, and a higher frequency pulse current may be obtained to charge the power battery. In this way, the battery heating apparatus can flexibly select, according to the type and state of the power battery, a pulse current frequency matching the power battery to heat it, thereby improving the heating performance.

In an implementation, the frequency of the pulse current for heating the power battery in the first heating mode is greater than the frequency of the pulse current in the second heating mode.

In an implementation, the second voltage transformation circuit includes a first bridge arm and a second bridge arm connected in parallel. The first bridge arm includes a first switch transistor and a second switch transistor, and the second bridge arm includes a third switch transistor and a fourth switch transistor. A first coil is connected between a connection point of the first switch transistor and the second switch transistor and a connection point of the third switch transistor and the fourth switch transistor.

The voltage transformation module is usually composed of a primary circuit where a primary coil is located and a secondary circuit where a secondary coil is located, and voltage step-up or step-down is achieved through a turns ratio of the primary coil to the secondary coil. When the charging apparatus charges the power battery through the voltage transformation module, the second voltage transformation circuit acts as the secondary circuit, and correspondingly, the first coil is the secondary coil. When the power battery discharges to the charging apparatus, the second voltage transformation circuit acts as the primary circuit, and correspondingly, the first coil is the primary coil. In this embodiment, the second voltage transformation circuit is formed based on a bridge arm circuit, and the second switch module and the energy storage element are added on the basis of the bridge arm circuit.

In an implementation, an inductor is connected between the connection point of the first switch transistor and the second switch transistor and the connection point of the third switch transistor and the fourth switch transistor.

The inductor may be configured together with the energy storage element to store electricity released by the power battery and release the electricity to the power battery, thereby further improving the heating effect on the power battery.

In an implementation, the second switch module includes a first switch and a second switch. The first switch is connected between the connection point of the first switch transistor and the second switch transistor and the first coil. The second switch and the energy storage element are connected in series, and the second switch and the energy storage element are connected in parallel at both ends of the first switch.

By arranging the first switch and the second switch, the energy storage element is capable of being controlled simply and effectively. In the second heating mode, when the first switch is turned on and the second switch is turned off, the energy storage element is bypassed from the second voltage transformation circuit. When the first switch is turned off and the second switch is turned on, the energy storage element is connected to the second voltage transformation circuit, for storing the electricity released by the power battery and releasing the electricity to the power battery, so as to realize the heating of the power battery.

In an implementation, the first switch transistor, the second switch transistor, the third switch transistor, and the fourth switch transistor are MOS transistors or IGBTs.

In an implementation, the first voltage transformation circuit includes a third bridge arm and a fourth bridge arm connected in parallel. The third bridge arm includes a fifth switch transistor and a sixth switch transistor, and the fourth bridge arm includes a seventh switch transistor and an eighth switch transistor. A second coil matching the first coil is connected between a connection point of the fifth switch transistor and the sixth switch transistor and a connection point of the seventh switch transistor and the eighth switch transistor.

Similarly, the first voltage transformation circuit is also formed based on a bridge arm circuit, and the first switch module is added on the basis of the bridge arm circuit.

In an implementation, the first switch module includes a third switch. The third switch is connected between the connection point of the fifth switch transistor and the sixth switch transistor and the second coil, or the third switch is connected to the third bridge arm or the fourth bridge arm in parallel.

By arranging the third switch, the first voltage transformation circuit is capable of being controlled simply and effectively. When the third switch is turned off, the first voltage transformation circuit is turned off. At this time, it is in the first heating mode, so that the power battery is heated only through the second voltage transformation circuit. When the third switch is turned on, the first voltage transformation circuit is turned on. At this time, it is in the second heating mode, and the first voltage transformation circuit and the second voltage transformation circuit jointly form a path for charging the power battery and a path for discharging of the power battery.

In an implementation, the fifth switch transistor, the sixth switch transistor, the seventh switch transistor, and the eighth switch transistor are MOS transistors or IGBTs.

In an implementation, the control module is specifically configured to control, in the first heating mode, the first switch to be turned off, the second switch to be turned on, and the third switch to be turned off; or control, in the second heating mode, the first switch to be turned on, the second switch to be turned off, and the third switch to be turned on.

By controlling the first switch, the second switch, and the third switch, it is possible to conveniently select the first heating mode or the second heating mode to heat the power battery according to heating demands of the power battery.

In an implementation, a heating cycle in the first heating mode includes a first stage and a second stage, and the control module is specifically configured to control, in the first stage, the first switch transistor and the fourth switch transistor to be closed, and the second switch transistor and the third switch transistor to be opened, so as to form a loop for discharging from the power battery to the energy storage element; and control, in the second stage, the first switch transistor and the fourth switch transistor to be opened, and the second switch transistor and the third switch transistor to be closed, so as to form a loop for charging the power battery by the energy storage element.

When the power battery is heated by using the first heating mode, by controlling the switch transistors on the two bridge arms in the second voltage transformation circuit, the loop for discharging from the power battery to the energy storage element and the loop for charging the power battery by the energy storage element are alternately formed in the first stage and the second stage, thereby heating the power battery during discharging and charging. The control operation is relatively simple, and a high switching frequency is capable of being achieved, thereby generating a high-frequency pulse current.

In an implementation, the heating cycle further includes a third stage and a fourth stage, and the control module is specifically configured to control, in the third stage, the first switch transistor and the fourth switch transistor to be opened, and the second switch transistor and the third switch transistor to be closed, so as to form a loop for discharging from the power battery to the energy storage element; and control, in the fourth stage, the first switch transistor and the fourth switch transistor to be closed, and the second switch transistor and the third switch transistor to be opened, so as to form a loop for charging the power battery by the energy storage element.

When the power battery is heated by using the first heating mode, after the first stage and the second stage, by controlling the switch transistors on the two bridge arms in the second voltage transformation circuit, the loop for discharging from the power battery to the energy storage element and the loop for charging the power battery by the energy storage element are alternately formed in the third stage and the fourth stage continuously, thereby heating the power battery during discharging and charging. The control operation is relatively simple, and a high switching frequency is capable of being achieved, thereby generating a high-frequency pulse current.

In an implementation, the control module is further configured to receive first instruction information sent by a battery management system BMS of the power battery, the first instruction information being used for instructing the battery heating apparatus to heat the power battery, and the first instruction information including a required frequency of the pulse current for heating the power battery; determine to heat the power battery by using the first heating mode if the required frequency is greater than a preset frequency; and determine to heat the power battery by using the second heating mode if the required frequency is less than the preset frequency.

In this embodiment, when the power of the power battery is low, before charging the power battery, if the temperature of the power battery is low, the BMS may send the first instruction information to instruct the battery heating apparatus to heat the power battery, thereby avoiding low temperature charging from damaging the power battery.

In an implementation, the control module is further configured to receive second instruction information sent by the BMS, the second instruction information being used for instructing the battery heating apparatus to stop heating the power battery; and stop heating the power battery according to the second instruction information.

In an implementation, the energy storage element is an inductor or a capacitor.

In an implementation, the voltage transformation module includes a bidirectional DC/DC converter, the first voltage transformation circuit includes one of a primary circuit and a secondary circuit of the bidirectional DC/DC converter, and the second voltage transformation circuit includes the other of the primary circuit and the secondary circuit.

In this embodiment, for the bidirectional DC/DC converter included in the charging apparatus, the first voltage transformation circuit includes one of the primary circuit and the secondary circuit of the bidirectional DC/DC converter, and the second voltage transformation circuit includes the other of the primary circuit and the secondary circuit. In this way, by adding the energy storage element and the switch module to the DC/DC converter and based on the corresponding control logic, the heating of the power battery may be realized without adding an additional heating module to a vehicle, which reduces the cost.

In an implementation, the charging apparatus includes an AC/DC converter, and the AC/DC converter and the voltage transformation module are connected between an AC power source and the power battery.

In an implementation, the charging apparatus includes an energy storage battery, and the bidirectional DC/DC converter is connected between the energy storage battery and the power battery.

In a second aspect, a control method for a battery heating apparatus is provided, and the battery heating apparatus is configured to heat a power battery. The battery heating apparatus includes a voltage transformation module. The voltage transformation module includes: a first voltage transformation circuit, and a first switch module connected to the first voltage transformation circuit, the first voltage transformation circuit being configured to connect a charging apparatus; and a second voltage transformation circuit, as well as an energy storage element and a second switch module connected to the second voltage transformation circuit, the second voltage transformation circuit being configured to connect the power battery. The control method includes controlling, in a first heating mode, the first switch module to turn off the first voltage transformation circuit, and controlling the second switch module so that the second voltage transformation circuit and the energy storage element form a loop for discharging from the power battery to the energy storage element and a loop for charging the power battery by the energy storage element, for heating the power battery during discharging and charging.

In an implementation, the control method further includes controlling, in a second heating mode, the first switch module and the second switch module so that the first voltage transformation circuit and the second voltage transformation circuit form a loop for discharging from the power battery to the charging apparatus and a loop for charging the power battery by the charging apparatus, for heating the power battery during discharging and charging.

In an implementation, the frequency of the pulse current for heating the power battery in the first heating mode is greater than the frequency of the pulse current in the second heating mode.

In an implementation, the second voltage transformation circuit includes a first bridge arm and a second bridge arm connected in parallel. The first bridge arm includes a first switch transistor and a second switch transistor, and the second bridge arm includes a third switch transistor and a fourth switch transistor. A first coil is connected between a connection point of the first switch transistor and the second switch transistor and a connection point of the third switch transistor and the fourth switch transistor.

In an implementation, an inductor is connected between the connection point of the first switch transistor and the second switch transistor and the connection point of the third switch transistor and the fourth switch transistor.

In an implementation, the second switch module includes a first switch and a second switch. The first switch is connected between the connection point of the first switch transistor and the second switch transistor and the first coil. The second switch and the energy storage element are connected in series, and the second switch and the energy storage element are connected in parallel at both ends of the first switch.

In an implementation, the first switch transistor, the second switch transistor, the third switch transistor, and the fourth switch transistor are MOS transistors or IGBTs.

In an implementation, the first voltage transformation circuit includes a third bridge arm and a fourth bridge arm connected in parallel. The third bridge arm includes a fifth switch transistor and a sixth switch transistor, and the fourth bridge arm includes a seventh switch transistor and an eighth switch transistor. A second coil matching the first coil is connected between a connection point of the fifth switch transistor and the sixth switch transistor and a connection point of the seventh switch transistor and the eighth switch transistor.

In an implementation, the first switch module includes a third switch. The third switch is connected between the connection point of the fifth switch transistor and the sixth switch transistor and the second coil, or the third switch is connected to the third bridge arm or the fourth bridge arm in parallel.

In an implementation, the fifth switch transistor, the sixth switch transistor, the seventh switch transistor, and the eighth switch transistor are MOS transistors or IGBTs.

In an implementation, the control method further includes controlling, in the first heating mode, the first switch to be turned off, the second switch to be turned on, and the third switch to be turned off; and controlling, in the second heating mode, the first switch to be turned on, the second switch to be turned off, and the third switch to be turned on.

In an implementation, a heating cycle in the first heating mode includes a first stage and a second stage, and the control method further includes controlling, in the first stage, the first switch transistor and the fourth switch transistor to be closed, and the second switch transistor and the third switch transistor to be opened, so as to form a loop for discharging from the power battery to the energy storage element; and controlling, in the second stage, the first switch transistor and the fourth switch transistor to be opened, and the second switch transistor and the third switch transistor to be closed, so as to form a loop for charging the power battery by the energy storage element.

In an implementation, the heating cycle further includes a third stage and a fourth stage, and the control method further includes controlling, in the third stage, the first switch transistor and the fourth switch transistor to be opened, and the second switch transistor and the third switch transistor to be closed, so as to form a loop for discharging from the power battery to the energy storage element; and controlling, in the fourth stage, the first switch transistor and the fourth switch transistor to be closed, and the second switch transistor and the third switch transistor to be opened, so as to form a loop for charging the power battery by the energy storage element.

In an implementation, the control method further includes receiving first instruction information sent by a battery management system BMS of the power battery, the first instruction information being used for instructing the battery heating apparatus to heat the power battery, and the first instruction information including a required frequency of the pulse current for heating the power battery; determining to heat the power battery by using the first heating mode if the required frequency is greater than a preset frequency; and determining to heat the power battery by using the second heating mode if the required frequency is less than the preset frequency.

In an implementation, the control method further includes receiving second instruction information sent by the BMS, the second instruction information being used for instructing the battery heating apparatus to stop heating the power battery; and stop heating the power battery according to the second instruction information.

In an implementation, the energy storage element is an inductor or a capacitor.

In an implementation, the voltage transformation module includes a bidirectional DC/DC converter, the first voltage transformation circuit includes one of a primary circuit and a secondary circuit of the bidirectional DC/DC converter, and the second voltage transformation circuit includes the other of the primary circuit and the secondary circuit.

In an implementation, the charging apparatus includes an AC/DC converter, and the AC/DC converter and the voltage transformation module are connected between an AC power source and the power battery.

In an implementation, the charging apparatus includes an energy storage battery, and the bidirectional DC/DC converter is connected between the energy storage battery and the power battery.

In a third aspect, a control circuit for a battery heating apparatus is provided, including a processor configured to perform the control method in the second aspect or any implementation of the second aspect.

In a fourth aspect, a power plant is provided, including a power battery; and the battery heating apparatus in the first aspect or any implementation of the first aspect, connected to the power battery and configured to heat the power battery.

DESCRIPTION OF DRAWINGS

In order to illustrate the technical solutions of the examples of the present application more clearly, the following briefly introduces the drawings required in the examples of the present application. Obviously, the drawings described below are only some embodiments of the present application. For those of ordinary skill in the art, other drawings can also be obtained according to the drawings without any creative efforts.

FIG. 5 is a schematic flow chart of a control method for a battery heating apparatus according to an embodiment of the present application.

FIG. 6 is a schematic block diagram of a control circuit for a battery heating apparatus according to an embodiment of the present application.

DETAILED DESCRIPTION

Figure 1:
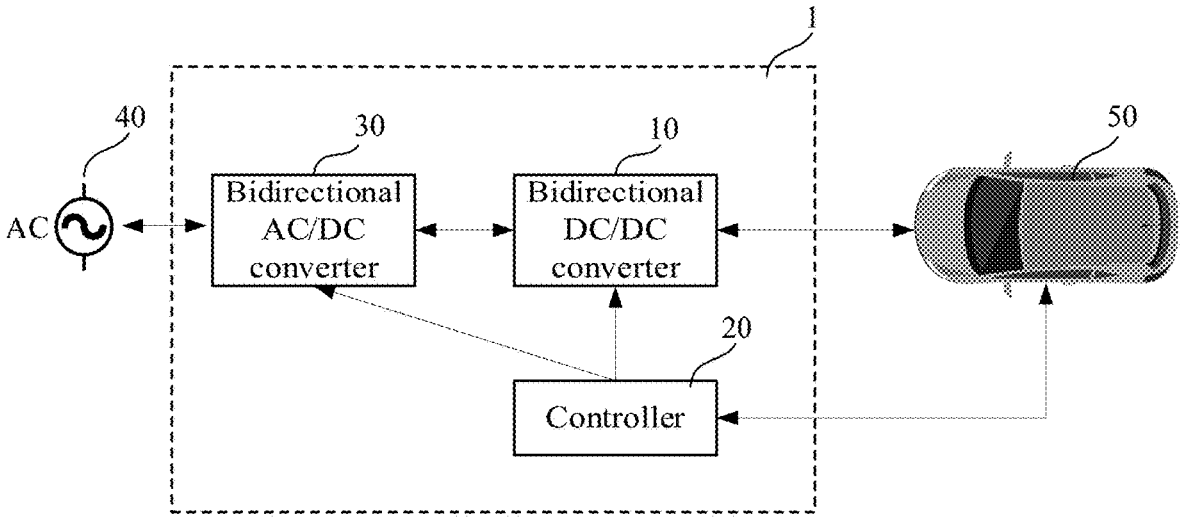
FIG. 1 is a schematic diagram of an application scenario of a battery heating apparatus according to an embodiment of the present application.

The implementations of the present application are further described in detail below with reference to the accompanying drawings and embodiments. The following detailed description of the embodiments and the drawings are used to illustrate the principles of the present application by way of example, but should not be used to limit the scope of the present application, that is, the present application is not limited to the described embodiments.

In the description of the present application, it should be noted that, unless otherwise stated, "plurality of" means two or more; the orientation or positional relationships indicated by the terms "upper," "lower," "left," "right," "inner," and "outer" are only for facilitating the description of the present application and simplifying the description, rather than indicating or implying that the apparatus or element referred to must have a particular orientation or be constructed and operated in a particular orientation, and therefore will not be interpreted as limiting the present application. In addition, the terms "first," "second," "third," and the like are used for descriptive purposes only, and cannot be construed as indicating or implying relative importance. "Perpendicular" is not strictly perpendicular, but within an allowable range of error. "Parallel" is not strictly parallel, but within the allowable range of error.

The orientation words appearing in the following description are directions shown in the figures, and do not limit the specific structure of the present application. In the description of the present application, it should be further noted that the terms "mounting," "connecting," and "connection" should be understood in a broad sense, unless otherwise explicitly specified or defined. For example, it may be a fixed connection, a detachable connection, or an integrated connection; and it may be a direct connection or an indirect connection through an intermediate medium. For those of ordinary skill in the art, the specific meanings of the above terms in the present application may be understood according to specific circumstances.

With the development of the times, new-energy vehicles have huge market prospects and can effectively promote energy saving and emission reduction due to their advantages such as environmental protection, low voice, and low cost of use, which is conducive to social development and progress.

Due to electrochemical properties of a power battery, in a low temperature environment, charging and discharging capacities of the power battery are greatly limited, which seriously affects the experience of a customer in using a vehicle in winter. Therefore, in order to enable the normal use of the power battery, it is needed to heat the power battery in the low temperature environment.

The power battery in the example of the present application may be a lithium-ion battery, a lithium-metal battery, a lead-acid battery, a nickel-cadmium battery, a nickel-metal hydride battery, a lithium-sulfur battery, a lithium-air battery, a sodium-ion battery, or the like, which is not limited here. In terms of scale, the power battery in the example of the present application may be a battery cell, or a battery module or a battery pack, which is not limited herein. In terms of an application scenario, the power battery may be applied in a power apparatus such as an automobile and a ship. For example, it may be applied to a power vehicle to supply power to a motor of the power vehicle as a power source for an electric vehicle. The power battery may also supply power to other electrical devices in the electric vehicle, such as an in-vehicle air conditioner and an in-vehicle player.

For ease of description, the solution of the present application will be described below by taking the power battery applied to a new-energy vehicle (that is, a power vehicle, or referred to as an electric vehicle) as an example.

Figure 2:
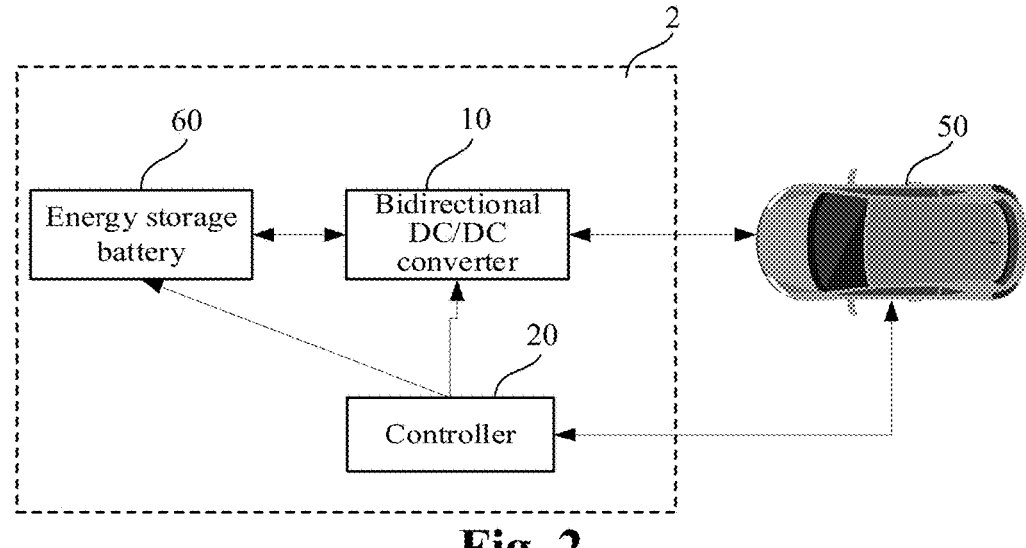
FIG. 2 is a schematic diagram of an application scenario of a battery heating apparatus according to an embodiment of the present application.

Generally, an AC power source or an energy storage battery may be used to charge the power battery. As an example, FIG. 1 and FIG. 2 show schematic diagrams of possible application scenarios according to an embodiment of the present application. For example, as shown in FIG. 1, the charging apparatus 1 may be, for example, a charging pile, and the charging apparatus 1 includes a bidirectional AC/DC converter 30, a bidirectional DC/DC converter 10, and a controller 20. The charging apparatus 1 may charge a vehicle 50 through an AC power source 40, such as a power grid. The bidirectional AC/DC converter 30 and the bidirectional DC/DC converter 10 are connected between the AC power source 40 and the vehicle 50. The bidirectional AC/DC converter 30 may convert an alternating current output by the AC power source 40 into a DC signal, and the DC signal is then voltage-converted by the bidirectional DC/DC converter 10, so as to charge the power battery in the vehicle 50. The controller 20 is configured to control the bidirectional AC/DC converter 30 and the bidirectional DC/DC converter 10, and is capable of communicating with a battery management system (BMS) in the vehicle 50.

For another example, as shown in FIG. 2, the charging apparatus 2 includes an energy storage battery 60 and a bidirectional DC/DC converter 10. The charging apparatus 2 may charge the vehicle 50 through the energy storage battery 60. The bidirectional DC/DC converter 10 is connected between the energy storage battery 60 and the vehicle 50, for performing voltage conversion on the DC signal output by the energy storage battery 60. The charging apparatus 2 may be, for example, a charging station, such as a smart micro-grid charging station for optical storage, charging, and inspection. The energy storage battery 60 may obtain power from the grid or photovoltaic panels through a Power Conversion System (PCS).

It should be understood that in some cases, for example, the charging apparatus is only configured to charge the power battery, the bidirectional AC/DC converter 30 may also be replaced by a unidirectional AC/DC converter, and the bidirectional DC/DC converter 10 may also be replaced by a unidirectional DC/DC converter.

In addition to outputting a DC current to charge the power battery, the charging apparatus may also be used as a battery heating apparatus that outputs a pulse current to heat the power battery. When the power battery is physically connected to the charging apparatus, if the power battery is in a low temperature state, charging the power battery at a low temperature may cause problems such as lithium plating, which may cause safety issues. Therefore, before charging the power battery, the charging apparatus may be used for heating the low-temperature power battery. For example, by controlling various switch transistors in the bidirectional AC/DC converter or bidirectional DC/DC converter, charging and discharging are alternately performed on the power battery and the charging apparatus, thereby heating the power battery during the charging and discharging. Then, the heated power battery is charged.

The alternation between discharging and charging in the heating process of the power battery forms a pulse current for heating the power battery. For example, a waveform of the pulse current may be a sine wave or a similar waveform. The frequency of the pulse current is associated with the frequency of charging and discharging alternations. For power batteries of different types and states, optimal frequencies of pulse currents for heating them may be different. Generally, the heating effect of a high-frequency pulse signal is worse than that of a low-frequency pulse signal, but the high-frequency pulse signal does less damage to the battery cell. For example, when the temperature of the power battery is low, only the high-frequency pulse current may be used for heating the power battery. When the temperature of the power battery is high, the low-frequency or high-frequency pulse current may be used for heating the power battery. For another example, for the power batteries of different vehicle models, cells have different bearing capacities, and frequencies of pulse currents required for heating are also different. Therefore, pulse currents having different frequencies may be required for different power batteries.

As shown above, various switch transistors in the bidirectional DC/DC converter may be controlled to perform alternative charging and discharging on the power battery and the charging apparatus, thereby heating the power battery during charging and discharging. However, limited by the switch performance and other reasons, the frequency of the pulse current generated in the heating process will not be too high. When a pulse current having a higher frequency is required to heat the power battery, this heating method cannot meet the demand.

To this end, the present application provides a heating solution, on the basis of a DC/DC converter, a switch module and an energy storage element are added, and through a corresponding control logic, a loop for discharging from the power battery to the energy storage element and a loop for charging the power battery by the energy storage element are formed, which may realize the heating of the power battery during discharging and charging.

Figure 3:
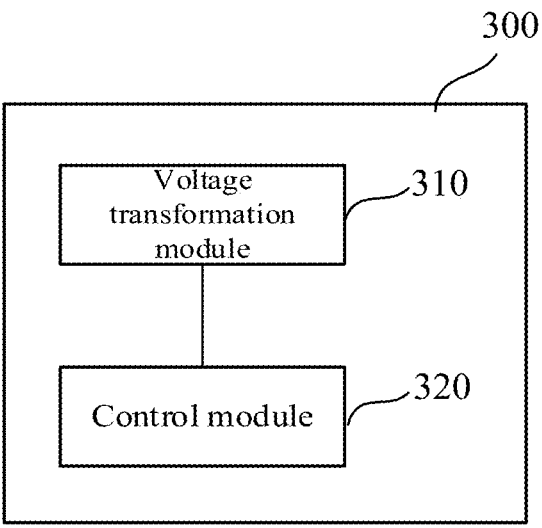
FIG. 3 is a schematic block diagram of a battery heating apparatus according to an embodiment of the present application.
Figure 4:
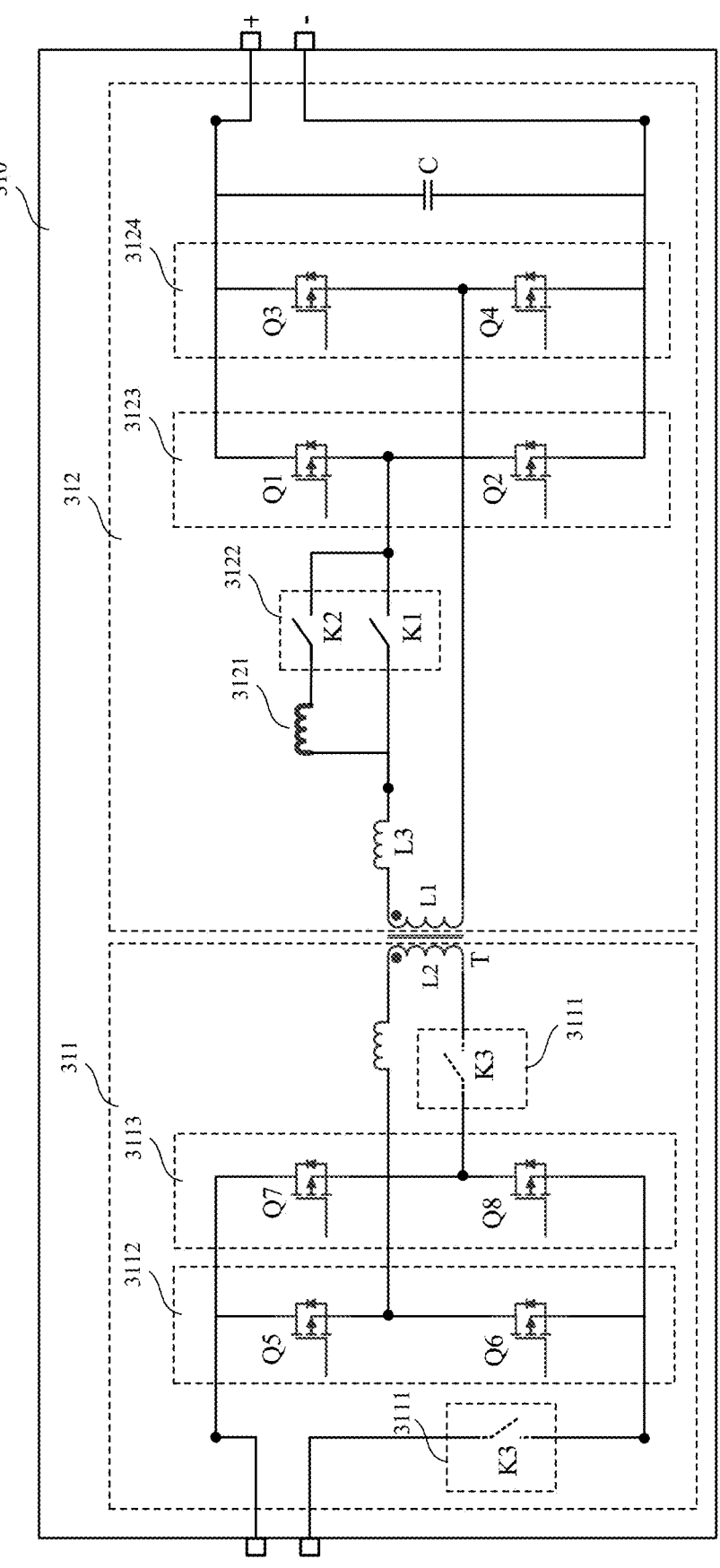
FIG. 4 is a schematic diagram of a possible specific implementation based on the battery heating apparatus shown in FIG. 2.

FIG. 3 shows a battery heating apparatus 300 configured to heat a power battery according to an embodiment of the present application. As shown in FIG. 3 and FIG. 4, the battery heating apparatus includes a voltage transformation module 310. The voltage transformation module 310 includes a first voltage transformation circuit 311, and a first switch module 3111 connected to the first voltage transformation circuit 311, the first voltage transformation circuit 311 being configured to a charging apparatus; and a second voltage transformation circuit 312, as well as an energy storage element 3121 and a second switch module 3122 connected to the second voltage transformation circuit 312, the second voltage transformation circuit 312 being configured to connect the power battery.

In an implementation, as shown in FIG. 3 and FIG. 4, the battery heating apparatus 300 further includes a control module 320. The control module 320 is configured to control the first switch module 3111 to turn off the first voltage transformation circuit 311, and control the second switch module 3122 so that the second voltage transformation circuit 312 and the energy storage element 3121 form a loop for discharging from the power battery to the energy storage element 3121 and a loop for charging the power battery by the energy storage element 3121, for heating the power battery during discharging and charging.

The present application refers to the above heating mode as a first heating mode, that is, in the first heating mode, the control module 320 controls the first switch module 3111 to turn off the first voltage transformation circuit 311 and controls the second switch module 3122 so that the second voltage transformation circuit 312 and the energy storage element 3121 form a loop for discharging from the power battery to the energy storage element 3121 and a loop for charging the power battery by the energy storage element 3121.

In this embodiment, the battery heating apparatus 300 includes the voltage transformation module 310, and the voltage transformation module 310 is composed of the first voltage transformation circuit 311 connected to the charging apparatus and the second voltage transformation circuit 312 connected to the power battery. The first switch module 3111 is added to the first voltage transformation circuit 311, and the second switch module 3122 and the energy storage element 3121 are added to the second voltage transformation circuit 312 to make up for an insufficient inductance of a coil in the second voltage transformation circuit 312. In this way, by controlling the first switch module 3111 to turn off the first voltage transformation circuit 311, and controlling the second switch module 3122 so that the second voltage transformation circuit 312 and the energy storage element 3121 form the loop for discharging from the power battery to the energy storage element 3121 and the loop for charging the power battery by the energy storage element 3121, which can realize the heating of the power battery during discharging and charging.

The energy storage element 3121 may be, for example, an inductor or a capacitor, which is not limited here.

In an implementation, the control module 320 is further configured to control the first switch module 3111 and the second switch module 3122 so that the first voltage transformation circuit 311 and the second voltage transformation circuit 312 form a loop for discharging from the power battery to the charging apparatus and a loop for charging the power battery by the charging apparatus, for heating the power battery during discharging and charging. The present application refers to this heating mode as a second heating mode.

In the heating solution of the present application, in addition to heating the power battery by using the first heating mode, the power battery may also be heated by using the second heating mode. In the second heating mode, by controlling the first switch module and the second switch module, the first voltage transformation circuit 311 and the second voltage transformation circuit 312 form the loop for discharging from the power battery to the charging apparatus and the loop for charging the power battery by the charging apparatus, which can realize the heating of the power battery during discharging and charging.

As mentioned above, the alternation between discharging and charging in the heating process of the power battery forms a pulse current, and the frequency of the pulse current is associated with the frequency of charging and discharging alternations. For power batteries of different types and states, frequencies of pulse currents required for heating them may be different. In the first heating mode, only the second voltage transformation circuit 312 and the energy storage element 3121 are used to realize charging and discharging of the power battery, thus shortening charging and discharging paths, reducing a certain amount of switch control operations, and avoiding unnecessary communication time delay during the control. Compared with the second heating mode, the switching frequency of a switch may be increased in the first heating mode, and a higher frequency pulse current may be obtained to charge the power battery. In this way, the battery heating apparatus 300 can flexibly select, according to the type and state of the power battery, a pulse current frequency matching the power battery to heat it, thereby improving the heating performance.

As can be seen, the frequency of the pulse current for heating the power battery in the first heating mode is greater than the frequency of the pulse current in the second heating mode. For example, when the power battery needs to be heated with a high-frequency pulse current, the first heating mode is adopted; and when the power battery needs to be heated with a low-frequency pulse current, the second heating mode is adopted.

For the DC/DC converter 10 such as the bidirectional DC/DC converter 10 included in the charging apparatus, the first voltage transformation circuit 311 may include, for example, one of a primary circuit and a secondary circuit of the bidirectional DC/DC converter 10, and the second voltage transformation circuit 312 may include, for example, the other of the primary circuit and the secondary circuit. Here, the primary circuit is a circuit where a primary coil is located, and the secondary circuit is a circuit where a secondary coil is located. For example, in the second heating mode, when the AC power source 40 or the energy storage battery 60 charges the power battery through the bidirectional DC/DC converter 10, the first voltage transformation circuit 311 is the primary circuit, and the second voltage transformation circuit 312 is the Secondary circuit. When the power battery is discharged through the bidirectional DC/DC converter 10, the first voltage transformation circuit 311 is the secondary circuit, and the second voltage transformation circuit 312 is the primary circuit.

In this embodiment, the voltage transformation module 310 is formed by adding the energy storage element 3121 and the switch module on the basis of the bidirectional DC/DC converter 10 in the charging apparatus, that is to say, the battery heating apparatus 300 is a part of the charging apparatus. The first voltage transformation circuit 311 includes one of the primary circuit and the secondary circuit of the bidirectional DC/DC converter 10, and the second voltage transformation circuit 312 includes the other of the primary circuit and the secondary circuit. By adding the energy storage element 3121 and the switch module to the bidirectional DC/DC converter 10 in the charging apparatus and based on the corresponding control logic, the heating of the power battery may be realized without adding an additional heating module on the vehicle 50 for heating the power battery, thereby reducing the cost.

Further, the charging apparatus may also include an AC/DC converter, such as the bidirectional AC/DC converter 30 in FIG. 1. The AC/DC converter and the voltage transformation module 310 are connected between the AC power source 40 and the power battery, for example, the bidirectional DC/DC converter 10 in FIG. 1 may be replaced by the voltage transformation module 310.

Alternatively, the charging apparatus may further include an energy storage battery 60, and the voltage transformation module 310 is connected between the energy storage battery 60 and the power battery. For example, the bidirectional DC/DC converter 10 in FIG. 2 may be replaced by the voltage transformation module 310.

It should be understood that when the required power of the charging apparatus is large, a plurality of voltage transformation modules 310 may be used in parallel to achieve power expansion. When the required output voltage of the charging apparatus is relatively large, a plurality of voltage transformation modules 310 may be used in series to increase the output voltage exponentially.

How the battery heating apparatus 300 heats the power battery will be described in detail below with reference to FIG. 4. FIG. 4 takes a DC/DC converter of LLC architecture as an example, and a voltage transformation module 310 is formed by adding the first switch module 3111, the second switch module 3122, and the energy storage element 3121. In a practical application, a DC/DC converter with architecture such as a Dual Active Bridge (DAB), a CLLC, a CF-DAB, and a Partial-Power Converter may also be used, so that by adding the switch module and the energy storage unit, it is capable of heating the power battery only by using the primary circuit or the secondary circuit, and the pulse current during the heating is capable of having a higher frequency.

In an implementation, as shown in FIG. 4, the second voltage transformation circuit 312 includes a first bridge arm 3123 and a second bridge arm 3124 connected in parallel. The first bridge arm 3123 includes a first switch transistor Q1 and a second switch transistor Q2, and the second bridge arm 3124 includes a third switch transistor Q3 and a fourth switch transistor Q4. A first coil L1 is connected between a connection point of the first switch transistor Q1 and the second switch transistor Q2 and a connection point of the third switch transistor Q3 and the fourth switch transistor Q4.

The voltage transformation module 310 is usually composed of a primary circuit where a primary coil is located and a secondary circuit where a secondary coil is located, and voltage step-up or step-down is achieved through a turns ratio of the primary coil to the secondary coil. When the charging apparatus charges the power battery through the voltage transformation module 310, the second voltage transformation circuit 312 acts as the secondary circuit, and correspondingly, the first coil L1 is the secondary coil. When the power battery discharges to the charging apparatus, the second voltage transformation circuit 312 acts as the primary circuit, and correspondingly, the first coil L1 is the primary coil. In this embodiment, the second voltage transformation circuit 312 is formed based on a bridge arm circuit, and the second switch module 3122 and the energy storage element 3121 are added on the basis of the bridge arm circuit.

In an implementation, as shown in FIG. 4, an inductor L3 is connected between the connection point of the first switch transistor Q1 and the second switch transistor Q2 and the connection point of the third switch transistor Q3 and the fourth switch transistor Q4. The inductor L3 may be configured together with the energy storage element 3121 to store electricity released by the power battery and release the electricity to the power battery, thereby further improving the heating effect on the power battery. In FIG. 4, the energy storage element 3121 being an inductor is taken as an example.

In an implementation, as shown in FIG. 4, the second switch module 3122 includes a first switch K1 and a second switch K2. The first switch K1 is connected between the connection point of the first switch transistor Q1 and the second switch transistor Q2 and the first coil L1. The second switch K2 and the energy storage element 3121 are connected in series, and the second switch K2 and the energy storage element 3121 are connected in parallel at both ends of the first switch K1.

By arranging the first switch K1 and the second switch K2, the energy storage element 3121 is capable of being controlled simply and effectively. In the second heating mode, when the first switch K1 is turned on and the second switch K2 is turned off, the energy storage element 3121 is bypassed from the second voltage transformation circuit 312. When the first switch K1 is turned off and the second switch K2 is turned on, the energy storage element 3121 is connected to the second voltage transformation circuit 312, for storing the electricity released by the power battery and releasing the electricity to the power battery, so as to realize the heating of the power battery.

In an implementation, the first voltage transformation circuit 311 includes a third bridge arm 3112 and a fourth bridge arm 3113 connected in parallel. The third bridge arm 3112 includes a fifth switch transistor Q5 and a sixth switch transistor Q6, and the fourth bridge arm 3113 includes a seventh switch transistor Q7 and an eighth switch transistor Q8. A second coil L2 matching the first coil L1 is connected between a connection point of the fifth switch transistor Q5 and the sixth switch transistor Q6 and a connection point of the seventh switch transistor Q7 and the eighth switch transistor Q8.

Similarly, the first voltage transformation circuit 311 is also formed based on a bridge arm circuit, and the first switch module 3111 is added on the basis of the bridge arm circuit.

In an implementation, the first switch module 3111 includes a third switch K3. The third switch K3 is connected between the connection point of the fifth switch transistor Q5 and the sixth switch transistor Q6 and the second coil L2, or the third switch K3 is connected to the third bridge arm 3112 or the fourth bridge arm 3113 in parallel.

By arranging the third switch K3, the first voltage transformation circuit 311 is capable of being controlled simply and effectively. When the third switch K3 is turned off, the first voltage transformation circuit 311 is turned off. At this time, it is in the first heating mode, so that the power battery is heated only through the second voltage transformation circuit 312. When the third switch K3 is turned on, the first voltage transformation circuit 311 is turned on. At this time, it is in the second heating mode, and the first voltage transformation circuit 311 and the second voltage transformation circuit 312 jointly form a path for charging the power battery and a path for discharging of the power battery. FIG. 4 shows two possible positions of the third switch K3, and in a practical application, one of them may be selected.

As shown in FIG. 4, the first switch transistor Q1, the second switch transistor Q2, the third switch transistor Q3, the fourth switch transistor Q4, the fifth switch transistor Q5, the sixth switch transistor Q6, the seventh switch transistor Q7, and the eighth switch transistor Q8 may be, for example, MOS transistors, or Insulated Gate Bipolar Transistors (IG-BTs).

As can be seen from FIG. 4, the charging apparatus of the present application, compared with the charging apparatus 1 in FIG. 1 and the charging apparatus 2 in FIG. 2, adds the first switch module 3111, the second switch module 3122, and the energy storage element 3121 on the basis of the bidirectional DC/DC converter 10 to form the voltage transformation module 310. In the second heating mode, the voltage transformation module 310 is the DC/DC converter 10, which is equivalent to a DC voltage conversion circuit. In the first heating mode, the second voltage transformation circuit 312 and the energy storage element 3121 in the voltage transformation module 310 constitute a simple LC oscillation circuit for heating the power battery.

By controlling the first switch K1, the second switch K2, and the third switch K3, it is possible to conveniently select the first heating mode or the second heating mode to heat the power battery according to heating demands of the power battery. For example, As shown in FIG. 4, in the first heating mode, the control module 320 controls the first switch K1 to be turned off, the second switch K2 to be turned on, and the third switch K3 to be turned off; in the second heating mode, the control module 320 controls the first switch K1 to be turned on, the second switch K2 to be turned off, and the third switch K3 to be turned on.

In some embodiments, in the second heating mode, in each heating cycle, the power battery first discharges to the charging apparatus, and the charging apparatus then charges the power battery, so as to alternately discharge and charge the power battery to avoid the phenomenon of lithium plating in the battery cell caused by heating of the power battery.

In an implementation, a heating cycle in the first heating mode includes a first stage and a second stage, and the control module 320 is specifically configured to:

control, in the first stage, the first switch transistor Q1 and the fourth switch transistor Q4 to be closed, and the second switch transistor Q2 and the third switch transistor Q3 to be opened, so as to form a loop for discharging from the power battery to the energy storage element. For example, as shown in FIG. 4, the first switch transistor Q1 and the fourth switch transistor Q4 are closed, and the second switch transistor Q2 and the third switch transistor Q3 are opened to form a path for discharging of the power battery: battery+ →Q1→energy storage element 3121→Q4→battery−. The power battery discharges to the energy storage element 3121, the inductor L3, and the coil L1 through the first switch transistor Q1 and the fourth switch transistor Q4.

In the second stage, the first switch transistor Q1 and the fourth switch transistor Q4 are controlled to be opened, and the second switch transistor Q2 and the third switch transistor Q3 are controlled to be closed, so as to form a loop for charging the power battery by the energy storage element 3121. For example, as shown in FIG. 4, the first switch transistor Q1 and the fourth switch transistor Q4 are opened, and the second switch transistor Q2 and the third switch transistor Q3 are closed to form a path for charging the power battery: energy storage element 3121→Q3→battery+ →battery−→Q2. The power battery is charged by the energy storage element 3121, the inductor L3, and the coil L1 through the second switch transistor Q2 and the third switch transistor Q3.

As can be seen, when the power battery is heated by using the first heating mode, by controlling the switch transistors on the two bridge arms in the second voltage transformation circuit 312, the loop for discharging from the power battery to the energy storage element 3121 and the loop for charging the power battery by the energy storage element 3121 are alternately formed in the first stage and the second stage, thereby heating the power battery during discharging and charging. The control operation is relatively simple, and a high switching frequency is capable of being achieved, thereby generating a high-frequency pulse current.

Further, in an implementation, the heating cycle further includes a third stage and a fourth stage, and the control module 320 is specifically configured to:

control, in the third stage, the first switch transistor Q1 and the fourth switch transistor Q4 to be opened, and the second switch transistor Q2 and the third switch transistor Q3 to be closed, so as to form a loop for discharging from the power battery to the energy storage element 3121. For example, as shown in FIG. 4, the first switch transistor Q1 and the fourth switch transistor Q4 are opened, and the second switch transistor Q2 and the third switch transistor Q3 are closed to form a path for discharging of the power battery: battery+ →Q3→energy storage element 3121→Q2→battery−. The power battery discharges to the energy storage element 3121, the inductor L3, and the coil L1 through the second switch transistor Q2 and the third switch transistor Q3.

In the fourth stage, the first switch transistor Q1 and the fourth switch transistor Q4 are controlled to be closed, and the second switch transistor Q2 and the third switch transistor Q3 are controlled to be opened, so as to form a loop for charging the power battery by the energy storage element 3121. For example, as shown in FIG. 4, the first switch transistor Q1 and the fourth switch transistor Q4 are closed, and the second switch transistor Q2 and the third switch transistor Q3 are opened to form a path for charging the power battery: energy storage element 3121→Q1→battery+ →battery−→Q4. The power battery is charged by the energy storage element 3121, the inductor L3, and the coil L1 through the first switch transistor Q1 and the fourth switch transistor Q4.

When the power battery is heated by using the first heating mode, after the first stage and the second stage, by controlling the switch transistors on the two bridge arms in the second voltage transformation circuit, the loop for discharging from the power battery to the energy storage element 3121 and the loop for charging the power battery by the energy storage element 3121 are alternately formed in the third stage and the fourth stage continuously, thereby heating the power battery during discharging and charging. The control operation is relatively simple, and a high switching frequency is capable of being achieved, thereby generating a high-frequency pulse current.

The order of the first stage and the second stage may be exchanged, and the order of the third stage and the fourth stage may also be exchanged. The above is only an example, and control sequences capable of realizing charging and discharging of the power battery all should be included in the protection scope of the present application.

Considering that the power battery is not suitable for charging at a low temperature; therefore, the embodiment of the present application further proposes that before charging the power battery, if the temperature of the power battery is low, the BMS will send first instruction information to the charging apparatus to instruct it to heat the power battery, thereby avoiding low temperature charging from damaging the power battery.

At this time, the control module 320 is further configured to receive the first instruction information sent by the BMS of the power battery, and heat the power battery according to the first instruction information, and the first instruction information is used for instructing the battery heating apparatus 300 to heat the power battery.

In an implementation, the first instruction information includes a required frequency of a pulse current used for heating the power battery. At this time, if the required frequency is greater than a preset frequency, the control module 320 determines to heat the power battery by using the first heating mode; and if the required frequency is less than the preset frequency, the control module 320 determines to heat the power battery by using the second heating mode.

The preset frequency may be, for example, the maximum frequency of the pulse current in the second heating mode.

In addition, the first instruction information may further include information such as the amplitude of the pulse current.

The BMS may, for example, determine the appropriate required frequency by looking up a table. Moreover, in the heating process, the required frequency may be adjusted accordingly based on the temperature rise of the power battery, and the BMS may send the first instruction information to the charging apparatus multiple times to update the required frequency.

As can be seen, when the power of the power battery is low, before charging the power battery by the charging apparatus, if the temperature of the power battery is low, the BMS may send the first instruction information to instruct the charging apparatus to heat the power battery, thereby avoiding low temperature charging from damaging the power battery.

Further, the control module 320 is further configured to receive second instruction information sent by the BMS, the second instruction information being used for instructing the battery heating apparatus 300 to stop heating the power battery; and stop heating the power battery according to the second instruction information.

Based on the above description, it can be seen that the battery heating apparatus 300 of the present application may be formed by adding the corresponding switch module and the energy storage element 3121 on the basis of the DC/DC converter. When it is required to heat the power battery by using a high-frequency pulse current, by controlling the switch module, only a single-side voltage transformation circuit may be used for forming the charging path and discharging path between the power battery and the energy storage element 3121, so as to heat the power battery by using the heat generated during charging and discharging.

In addition, by controlling the switch module, it is capable of realizing two heating modes, respectively matching requirements of the power battery for pulse currents of different frequencies, thereby improving the heating performance.

The present application further provides a control method for the battery heating apparatus 300, the battery heating apparatus 300 is configured to heat a power battery, the battery heating apparatus 300 includes a voltage transformation module 310, and the voltage transformation module 310 includes: a first voltage transformation circuit 311, and a first switch module 3111 connected to the first voltage transformation circuit 311, the first voltage transformation circuit 311 being configured to connect a charging apparatus; and a second voltage transformation circuit 312, as well as an energy storage element 3121 and a second switch module 3122 connected to the second voltage transformation circuit 312, the second voltage transformation circuit 312 being configured to connect the power battery.

As shown in FIG. 5, the control method 500 includes a step 510. In an implementation, the method 500 may further include a step 520.

In the step 510, in the first heating mode, the first switch module 3111 is controlled to turn off the first voltage transformation circuit 311, and the second switch module 3122 is controlled so that the second voltage transformation circuit 312 and the energy storage element 3121 form a loop for discharging from the power battery to the energy storage element 3121 and a loop for charging the power battery by the energy storage element 3121, for heating the power battery during discharging and charging.

In the step 520, in the second heating mode, the first switch module 3111 and the second switch module 3122 are controlled, so that the first voltage transformation circuit 311 and the second voltage transformation circuit 312 form the loop for discharging from the power battery to the charging apparatus and the loop for charging the power battery by the charging apparatus, for heating the power battery during discharging and charging.

In an implementation, the frequency of the pulse current for heating the power battery in the first heating mode is greater than the frequency of the pulse current in the second heating mode.

In an implementation, the second voltage transformation circuit 312 includes a first bridge arm 3123 and a second bridge arm 3124 connected in parallel. The first bridge arm 3123 includes a first switch transistor Q1 and a second switch transistor Q2, and the second bridge arm 3124 includes a third switch transistor Q3 and a fourth switch transistor Q4. A first coil L1 is connected between a connection point of the first switch transistor Q1 and the second switch transistor Q2 and a connection point of the third switch transistor Q3 and the fourth switch transistor Q4.

In an implementation, an inductor is connected between the connection point of the first switch transistor Q1 and the second switch transistor Q2 and the connection point of the third switch transistor Q3 and the fourth switch transistor Q4.

In an implementation, the second switch module 3122 includes a first switch K1 and a second switch K2. The first switch K1 is connected between the connection point of the first switch transistor Q1 and the second switch transistor Q2 and the first coil L1. The second switch K2 and the energy storage element 3121 are connected in series, and the second switch K2 and the energy storage element 3121 are connected in parallel at both ends of the first switch K1.

In an implementation, the first switch transistor Q1, the second switch transistor Q2, the third switch transistor Q3, and the fourth switch transistor Q4 are MOS transistors or IGBTs.

In an implementation, the first voltage transformation circuit 311 includes a third bridge arm 3112 and a fourth bridge arm 3113 connected in parallel. The third bridge arm 3112 includes a fifth switch transistor Q5 and a sixth switch transistor Q6, and the fourth bridge arm 3113 includes a seventh switch transistor Q7 and an eighth switch transistor Q8. A second coil L2 matching the first coil L1 is connected between a connection point of the fifth switch transistor Q5 and the sixth switch transistor Q6 and a connection point of the seventh switch transistor Q7 and the eighth switch transistor Q8.

In an implementation, the first switch module 3111 includes a third switch K3. The third switch K3 is connected between the connection point of the fifth switch transistor Q5 and the sixth switch transistor Q6 and the second coil L2, or the third switch K3 is connected to the third bridge arm 3112 or the fourth bridge arm 3113 in parallel.

In an implementation, the fifth switch transistor Q5, the sixth switch transistor Q6, the seventh switch transistor Q7, and the eighth switch transistor Q8 are MOS transistors or IGBTs.

In an implementation, the control method 500 further includes controlling, in the first heating mode, the first switch K1 to be turned off, the second switch K2 to be turned on, and the third switch K3 to be turned off; and controlling, in the second heating mode, the first switch K1 to be turned on, the second switch K2 to be turned off, and the third switch K3 to be turned on.

In an implementation, a heating cycle in the first heating mode includes a first stage and a second stage, and the control method 500 further includes controlling, in the first stage, the first switch transistor Q1 and the fourth switch transistor Q4 to be closed, and the second switch transistor Q2 and the third switch transistor Q3 to be opened, so as to form a loop for discharging from the power battery to the energy storage element 3121; and controlling, in the second stage, the first switch transistor Q1 and the fourth switch transistor Q4 to be opened, and the second switch transistor Q2 and the third switch transistor Q3 to be closed, so as to form a loop for charging the power battery by the energy storage element 3121.

In an implementation, the heating cycle further includes a third stage and a fourth stage, and the control method 500 further includes controlling, in the third stage, the first switch transistor Q1 and the fourth switch transistor Q4 to be opened, and the second switch transistor Q2 and the third switch transistor Q3 to be closed, so as to form a loop for discharging from the power battery to the energy storage element 3121; and controlling, in the fourth stage, the first switch transistor Q1 and the fourth switch transistor Q4 to be closed, and the second switch transistor Q2 and the third switch transistor Q3 to be opened, so as to form a loop for charging the power battery by the energy storage element 3121.

In an implementation, the control method 500 further includes receiving first instruction information sent by a battery management system BMS of the power battery, the first instruction information being used for instructing the battery heating apparatus 300 to heat the power battery, and the first instruction information including a required frequency of the pulse current for heating the power battery; determining to heat the power battery by using the first heating mode if the required frequency is greater than a preset frequency; and determining to heat the power battery by using the second heating mode if the required frequency is less than the preset frequency.

In an implementation, the control method 500 further includes receiving second instruction information sent by the BMS, the second instruction information being used for instructing the battery heating apparatus 300 to stop heating the power battery; and stop heating the power battery according to the second instruction information.

In an implementation, the energy storage element 3121 is an inductor or a capacitor.

In an implementation, the voltage transformation module 310 includes a bidirectional DC/DC converter, the first voltage transformation circuit 311 includes one of a primary circuit and a secondary circuit of the bidirectional DC/DC converter, and the second voltage transformation circuit 312 includes the other of the primary circuit and the secondary circuit.

In an implementation, the charging apparatus includes an AC/DC converter, and the AC/DC converter and the voltage transformation module 310 are connected between an AC power source and the power battery.

In an implementation, the charging apparatus includes an energy storage battery, and the bidirectional DC/DC converter is connected between the energy storage battery and the power battery.

It should be understood that, for specific details of the control method 500, reference may be made to the foregoing description of the battery heating apparatus 300, and details are not repeated here for brevity.

FIG. 6 is a schematic block diagram of a control circuit 600 for a battery heating apparatus according to an embodiment of the present application. As shown in FIG. 6, the control circuit 600 includes a processor 610. Optionally, the control circuit 600 further includes a memory 620, wherein the memory 620 is configured to store instructions, and the processor 610 is configured to read the instructions and perform, based on the instructions, the control method 500 for the battery heating apparatus 300 in various embodiments of the present application.

Figure 7:
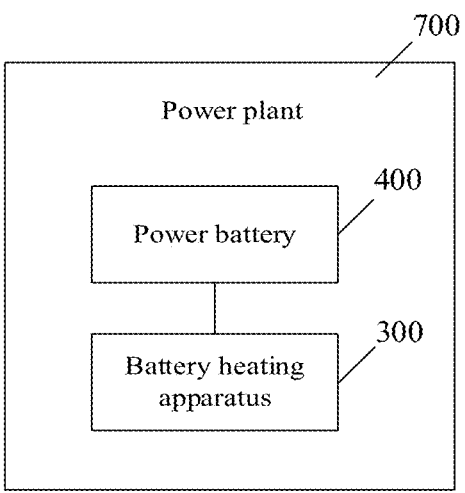
FIG. 7 is a schematic block diagram of a power plant according to an embodiment of the present application.

FIG. 7 is a schematic block diagram of a power plant 700 according to an embodiment of the present application. The power plant 700 includes a power battery 400, and the battery heating apparatus 300 in any one of the above embodiments. The battery heating apparatus 300 is connected to the power battery 400, for heating the power battery 400. The power plant 700 may be, for example, a power vehicle or the like.

Those of ordinary skill in the art may realize that units and algorithm steps of each example described with reference to the examples disclosed herein can be implemented in electronic hardware, or a combination of computer software and electronic hardware. Whether these functions are performed in hardware or software depends on a specific application and a design constraint condition of the technical solution. Those skilled in the art may implement the described functions using different methods for each particular application, but such implementations should not be considered beyond the scope of the present application.

Those skilled in the art can clearly understand that, for the convenience and brevity of description, the specific working process of the system, apparatus, and unit described above may be obtained with reference to the corresponding process in the foregoing method embodiments, which will not be repeated here.

In the several examples provided in the present application, it should be understood that the disclosed system, apparatus, and method may be implemented in other manners. For example, the apparatus example described above is only illustrative. For example, the division of the units is only a logical function division. In an actual implementation, there may be other division methods. For example, a plurality of units or components may be combined or may be integrated into another system, or some features may be ignored, or not implemented. On the other hand, the shown or discussed mutual coupling or direct coupling or communication connection may be indirect coupling or communication connection through some interfaces, apparatuses, or units, and may be in electrical, mechanical, or in other forms.

The units described as separate components may or may not be physically separated, and components displayed as units may or may not be physical units, that is, may be located in one place, or may be distributed to a plurality of network units. Some or all of the units may be selected according to actual needs to achieve the purpose of the solution in this example.

What is claimed is:

1. A battery heating apparatus, configured to heat a power battery, comprising: a voltage transformation module, the voltage transformation module comprising: a first voltage transformation circuit, and a first switch module connected to the first voltage transformation circuit, the first voltage transformation circuit being configured to connect to a charging apparatus; and a second voltage transformation circuit, and an energy storage element and a second switch module connected to the second voltage transformation circuit, the second voltage transformation circuit being configured to connect to the power battery, wherein: the second switch module includes a first switch and a second switch; the second switch and the energy storage element are connected in series, and the second switch and the energy storage element are connected in parallel at both ends of the first switch; and the first switch, the second switch, and the energy storage element are isolated from the first voltage transformation circuit and a control module configured to: in a first heating mode, control the first switch module to turn off the first voltage transformation circuit, control the first switch to be turned off, and control the second switch module to be turned on, so that the second voltage transformation circuit and the energy storage element form a loop for discharging from the power battery to the energy storage element and a loop for charging the power battery by the energy storage element, for heating the power battery during discharging and charging; wherein the control module is further configured to: control, in a second heating mode, the first switch module and the second switch module so that the first voltage transformation circuit and the second voltage transformation circuit form a loop for discharging from the power battery to the charging apparatus and a loop for charging the power battery by the charging apparatus, for heating the power battery during discharging and charging; wherein a frequency of a pulse current for heating the power battery in the first heating mode is greater than a frequency of a pulse current in the second heating mode.

2. The battery heating apparatus according to claim 1, wherein the control module is further configured to: receive first instruction information sent by a battery management system (BMS) of the power battery, the first instruction information being used for instructing the battery heating apparatus to heat the power battery, and the first instruction information comprising a required frequency of a pulse current for heating the power battery; determine to heat the power battery by using the first heating mode in response to the required frequency being greater than a preset frequency; and determine to heat the power battery by using the second heating mode in response to the required frequency being less than the preset frequency.

3. The battery heating apparatus according to claim 2, wherein the control module is further configured to: receive second instruction information sent by the BMS, the second instruction information being used for instructing the battery heating apparatus to stop heating the power battery; and stop heating the power battery according to the second instruction information.

4. The battery heating apparatus according to claim 1, wherein the second voltage transformation circuit comprises a first bridge arm and a second bridge arm connected in parallel, the first bridge arm comprises a first switch transistor and a second switch transistor, the second bridge arm comprises a third switch transistor and a fourth switch transistor, and a first coil is connected between a connection point of the first switch transistor and the second switch transistor and a connection point of the third switch transistor and the fourth switch transistor.

5. The battery heating apparatus according to claim 4, wherein an inductor is connected between the connection point of the first switch transistor and the second switch transistor and the connection point of the third switch transistor and the fourth switch transistor.

6. The battery heating apparatus according to claim 4, wherein: the first switch is connected between the connection point of the first switch transistor and the second switch transistor and the first coil.

7. The battery heating apparatus according to claim 4, wherein the first switch transistor, the second switch transistor, the third switch transistor, and the fourth switch transistor are MOS transistors or insulated gate bipolar transistors (IGBTs).

8. The battery heating apparatus according to claim 4, wherein the first voltage transformation circuit comprises a third bridge arm and a fourth bridge arm connected in parallel, the third bridge arm comprises a fifth switch transistor and a sixth switch transistor, the fourth bridge arm comprises a seventh switch transistor and an eighth switch transistor, and a second coil matching the first coil is connected between a connection point of the fifth switch transistor and the sixth switch transistor and a connection point of the seventh switch transistor and the eighth switch transistor.

9. The battery heating apparatus according to claim 8, wherein the fifth switch transistor, the sixth switch transistor, the seventh switch transistor, and the eighth switch transistor are MOS transistors or IGBTs.

10. The battery heating apparatus according to claim 8, wherein: the first switch module comprises a third switch; and the third switch is connected between the connection point of the fifth switch transistor and the sixth switch transistor and the second coil, or the third switch is connected to the third bridge arm or the fourth bridge arm in parallel.

11. The battery heating apparatus according to claim 10, wherein the control module is further configured to: control, in the first heating mode, the third switch to be turned off, and control, in a second heating mode, the first switch to be turned on, the second switch to be turned off, and the third switch to be turned on.

12. The battery heating apparatus according to claim 11, wherein a heating cycle in the first heating mode comprises a first stage and a second stage, and the control module is further configured to: control, in the first stage, the first switch transistor and the fourth switch transistor to be closed, and the second switch transistor and the third switch transistor to be opened, so as to form a loop for discharging from the power battery to the energy storage element; and control, in the second stage, the first switch transistor and the fourth switch transistor to be opened, and the second switch transistor and the third switch transistor to be closed, so as to form a loop for charging the power battery by the energy storage element.

13. The battery heating apparatus according to claim 12, wherein the heating cycle further comprises a third stage and a fourth stage, and the control module is further configured to: control, in the third stage, the first switch transistor and the fourth switch transistor to be opened, and the second switch transistor and the third switch transistor to be closed, so as to form a loop for discharging from the power battery to the energy storage element; and control, in the fourth stage, the first switch transistor and the fourth switch transistor to be closed, and the second switch transistor and the third switch transistor to be opened, so as to form a loop for charging the power battery by the energy storage element.

14. The battery heating apparatus according to claim 1, wherein the voltage transformation module comprises a bidirectional DC/DC converter, the first voltage transformation circuit comprises one of a primary circuit and a secondary circuit of the bidirectional DC/DC converter, and the second voltage transformation circuit comprises another one of the primary circuit and the secondary circuit.

15. The battery heating apparatus according to claim 14, wherein: the charging apparatus comprises an AC/DC converter, and the AC/DC converter and the voltage transformation module are connected between an AC power source and the power battery; or the charging apparatus comprises an energy storage battery, and the bidirectional DC/DC converter is connected between the energy storage battery and the power battery.

16. A power plant, comprising: a power battery; and the battery heating apparatus according to claim 1, connected to the power battery and configured to heat the power battery.

17. A control method for the battery heating apparatus according to claim 1, comprising: in a first heating mode, controlling the first switch module to turn off the first voltage transformation circuit, controlling the first switch to be turned off, and controlling the second switch to be turned on, so that the second voltage transformation circuit and the energy storage element form a loop for discharging from the power battery to the energy storage element and a loop for charging the power battery by the energy storage element, for heating the power battery during discharging and charging.

18. The control method according to claim 17, further comprising: controlling, in a second heating mode, the first switch module and the second switch module so that the first voltage transformation circuit and the second voltage transformation circuit form a loop for discharging from the power battery to the charging apparatus and a loop for charging the power battery by the charging apparatus, for heating the power battery during discharging and charging.

19. The control method according to claim 18, wherein a frequency of a pulse current for heating the power battery in the first heating mode is greater than a frequency of a pulse current in the second heating mode.

20. A battery heating apparatus, configured to heat a power battery, comprising: a voltage transformation module, the voltage transformation module comprising: a first voltage transformation circuit, and a first switch module connected to the first voltage transformation circuit, the first voltage transformation circuit being configured to connect to a charging apparatus; and a second voltage transformation circuit, and an energy storage element and a second switch module connected to the second voltage transformation circuit, the second voltage transformation circuit being configured to connect to the power battery, wherein: the second voltage transformation circuit comprises a first bridge arm and a second bridge arm connected in parallel, the first bridge arm comprises a first switch transistor and a second switch transistor, the second bridge arm comprises a third switch transistor and a fourth switch transistor, and a first coil is connected between a connection point of the first switch transistor and the second switch transistor and a connection point of the third switch transistor and the fourth switch transistor; the first voltage transformation circuit comprises a third bridge arm and a fourth bridge arm connected in parallel, the third bridge arm comprises a fifth switch transistor and a sixth switch transistor, the fourth bridge arm comprises a seventh switch transistor and an eighth switch transistor, and a second coil matching the first coil is connected between a connection point of the fifth switch transistor and the sixth switch transistor and a connection point of the seventh switch transistor and the eighth switch transistor the second switch module includes a first switch and a second switch; the first switch module comprises a third switch, the third switch being connected between the connection point of the fifth switch transistor and the sixth switch transistor and the second coil, or the third switch being connected to the third bridge arm or the fourth bridge arm in parallel; and a control module configured to: in a first heating mode, control the first switch module to turn off the first voltage transformation circuit, control the first switch to be turned off, control the second switch to be turned on, and control the third switch to be turned off, so that the second voltage transformation circuit and the energy storage element form a loop for discharging from the power battery to the energy storage element and a loop for charging the power battery by the energy storage element, for heating the power battery during discharging and charging; and in a second heating mode, control the first switch to be turned on, control the second switch to be turned off, and control the third switch to be turned on.

* * * * *